United States Patent Office 2,813,004
Patented Nov. 12, 1957

2,813,004

PROCESS FOR SEPARATING PLUTONIUM FROM IMPURITIES

Arthur C. Wahl, University City, Mo., assignor to the United States of America as represented by the United States Atomic Energy Commission No Drawing. Application December 19, 1947, Serial No. 792,833

1 Claim. (Cl. 23—14.5)

This invention relates to a process for separating plutonium (element 94) from impurities and more particularly to a separation process for removing plutonium from a solution containing both plutonium and uranium.

Plutonium is usually made by irradiating uranium 238 material in a neutronic reactor and removing the uranium material from the reactor. After suitable delay, it is predominantly uranium with a small amount of plutonium and other transuranic elements and about the same amount of fission products. In order to obtain pure plutonium it must be separated or extracted from the uranium and must be separated or decontaminated from the various fission products.

This separation of plutonium and uranium is difficult to achieve because their chemical properties are very similar. This similarity has been explained by the use of the hypothesis that uranium, neptunium and plutonium together with various other transuranic elements form a second series analogous to the first rare earth series. This chemical similarity may be due to the fact that as the transuranic elements progress in atomic weight the additional electrons are added to an inner ring rather than to the outer incomplete ring of electrons, thus leaving unchanged the outer ring structure which substantially controls the chemical properties.

In any event although uranium and plutonium have very similar chemical properties, uranium is known to exist in the plus four and plus six valence state, and plutonium in at least the plus six, four and three. A number of methods for separating these two elements and their compounds have been worked out on the basis of the difference in physical and chemical properties of the elements in these various states.

In order to purify the plutonium it is necessary first to obtain a method which will make extraction possible even when the plutonium is present in such low concentration that most compounds thereof do not precipitate. At the same time it is necessary to decontaminate the plutonium to the point that it can be more readily handled by removing as much of the radioactive fission products as possible.

One such method that has been used successfully is the "carrier" precipitation method. This method consists essentially of the addition of a finely divided insoluble compound or preferably its components so that the insoluble compound forms in the solution. The necessary contact may be effected by any of the known techniques for effecting adequate contact of liquids with insoluble solids. The mechanism of carrying is not fully understood but is believed to be effected in some cases by the incorporation of the ion to be carried into the carrier crystal lattice, in other cases by surface adsorption of the ion to be carried and in others by a combination of both. Experience has shown that the carrier must yield one inorganic cation and one anion which is an ionic component of an insoluble compound of the ion, e. g. plutonium, to be carried; the carried compound formed must not be appreciably more soluble than the carrier. The carrier may yield under certain conditions more than one cation or anion or more than one of both.

The use of the carrier procedure for separating plutonium from uranium is complicated by the fact that either isomorphic carriers, i. e., those having a crystalline structure with cation spacing in the crystal lattice such that plutonium ions may be substituted in that lattice for carrier cations, or other carriers of the same range of ionic radii are necessary. A carrier must be selected that is not isomorphic with any of the contaminating cations or, in the event this can not be accomplished, one that is isomorphic with the least number of contaminating cations must be selected and the process repeated.

It is to be noted that a carrier is normally only effective for one valence of the material to be carried and that separation depends on the maintenance of the desired and undesired compounds in the proper relative valence.

As a result of the various carrier precipitations plutonium is obtained that is sufficiently concentrated for the use of ordinary precipitation methods and is sufficiently decontaminated for handling in plant use. But even after those steps the plutonium although considerably concentrated often still contains a number of fission products which must be removed and still requires additional concentration.

Another method which may be used in the purification of plutonium which is present in such low concentration that none of its known compounds will precipitate is the electrodeposition of the plutonium simultaneously with the electrodeposition of the carrier. Although it is difficult to separate plutonium by electrolytic means since it is a strongly electropositive metal not far below the alkali metals in the electromotive series, it is possible to do so since plutonium may readily be electrodeposited as an oxygenated compound by the electrolysis of suitable solutions of plutonium in hydroxyl solvents.

The use of electrolytic means to thus purify plutonium requires the use of expensive equipment with high power consumption. It requires skilled operators and considerable control equipment not only for the electrolytic deposition itself but also for the adjusting of the conductivity of the solutions and even the placing of the metals in solution. The process is not a wholly satisfactory means for separating uranium from plutonium.

Attempts have also been made to purify plutonium by the use of adsorbents. These adsorbents are usually placed in an adsorbing tower or some other device for obtaining a large separation area. The solution containing the uranium, plutonium and fission products is cycled through the towers. A number of these towers placed in series are known as cascades and are arranged to permit recycling within certain series of the towers. The adsorbent usually adsorbs the plutonium and a number of other compounds. Other solutions are then passed through the towers which elutriates the impurities and finally the plutonium, preferably by itself or at least with the least possible amount of impurities present. The process is repeated as necessary until the plutonium is present in a relatively pure state. In practice a number of adsorbents have been tried including silicious materials, a synthetic titantia-mica "zeolite," and a synthetic cation exchange resin (Amberlite IR–1).

A method has been worked out for purifying the plutonium based upon the difference of solubility of uranium and plutonium nitrate in the plus six and plus four state in a solvent such as ether. This method can be used as the first step in a process since it removes most of the higher valent uranium. In one such method an organic solvent such as a dialkyl ether and especially diethyl ether, has been used as a solvent. When the irradiated material is removed from the pile or neutronic reactor, allowed to stand for a period of time and then dissolved in nitric acid, the uranium is present as uranyl nitrate hexahydrate while the plutonium is in the tetravalent state. When the material is extracted with the ether most of the uranyl nitrate goes into the organic phase while the aqueous phase contains the rest of the uranyl nitrate and substantially all the other components of the solution consisting of the original water of crystallization and the bulk of the uranium fission products and plutonuim. This method has been used on a large scale employing a two-stage batch process using in each stage from 2 to 20 volumes of the ether per volume of the material to be extracted. Such a process separates the uranium to the point that other methods may be used in producing pure plutonium. Alternatively the plutonium as plutonyl nitrate may be extracted with the organic solvent leaving the impurities in aqueous solution.

It may be seen that the above method does not give complete separation since some of the plutonium will follow the uranium or vice versa. The method is useful but requires very careful engineering and operation due to the use of the ether with its known health, explosive and fire hazards.

Study of the above methods shows that while each of these are useful and each constitutes a significant contribution to the technology of obtaining plutonium from uranium, a method is still necessary which is efficient and easy to operate and which will separate uranium from plutonium yielding a product which is pure and in such a condiiton that it can be used directly as an intermediate in producing plutonium end products.

It is a primary object of this invention to provide a method for reducing the valence of plutonium.

It is an additional object to provide a method for selectively reducing plutonium valence without altering the valence of uranium.

It is also an object of this invention to provide a process for separating plutonium from uranium which is efficient, easily operated, and which does not require complicated equipment.

It is a further object of this invention to determine a method of separating plutonium from uranium which is efficient and can be operated on a plant scale.

It is a further object of this invention to determine a method of separating plutonium from uranium which can be carried out by equipment which is inexpensive, easy to design, which will give longer service with little depreciation due to corrosion and which can be readily procured.

Still further objects and advantages of this invention will appear in the forthcoming description.

The objects of this invention are achieved by treating impure plutonium material so as to reduce the plutonium compound to the plus three oxidation state and then forming an insoluble compound of plutonium in the reduced state.

The objects of this invention are attained by the present process which comprises reducing the valence of plutonium by treating it in solution with a soluble iodide.

The preferred process is more specifically described in the following steps.

The first step of the process for separating plutonium and uranium is to maintain the uranium in the plus six state while the plutonium is reduced. In order to reduce all the plutonium to the plus three state while maintaining uranium in the plus six state it is necessary to obtain a reducing agent which has the proper oxidation-reduction potential. The standard oxidation-reduction potentials for the $Pu^{III}$—$Pu^{IV}$, $Pu^{IV}$—$Pu^{VI}$, and $U^{IV}$—$U^{VI}$ couples, referred to the hydrogen-hydrogen ion couple as zero, for unit activities and temperatures at 25° C. are about as follows:

|  | Volts |
|---|---|
| $Pu^{+III} = Pu^{+IV} + e^-$ | −0.95 |
| $Pu^{+IV} + 2H_2O = PuO_2^{+II} + 4H^+ + 2e^-$ | −1.005 |
| $U^{+IV} + 2H_2O = UO_2^{+II} + 4H^+ + 2e^-$ | −0.41 |

It may be seen that the selective reduction of $PuO_2^{+II}$ to the $Pu^{+III}$ can be accomplished while leaving the $UO_2^{+II}$ in that valence state, if a reducing agent can be discovered having an oxidation-reduction potential in volts that is more positive than −0.95 volt (i. e., less negative) and less positive than −0.41 volt (i. e., more negative) and which does not for any reason interfere with the reaction. It may be seen that this potential is sufficient to reduce $Pu^{IV}$ to $Pu^{III}$.

These potentials are not seriously affected by minor variations in temperature, activity, or gas pressures from the standard values.

The plutonium and uranium are usually in the form of nitrates or chlorides. Experience has now shown that the preferential reduction of plutonium can best be accomplished by the use of iodide ion $I^-$. Under the same standard conditions as listed supra the oxidation potential is as follows:

|  | Volts |
|---|---|
| 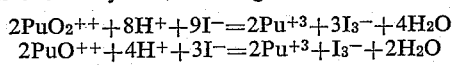 | −0.535 |
| $3I^- = I_3^- + 2e^-$ | −0.54 |

Thus it may be seen that the $I^-$ ion meets the requirement of falling between −0.41 volt and −0.95 volt.

Experience has indicated that the iodide ion may be furnished by hydrogen iodide, or by alkali metal iodides, ammonium iodide or other soluble iodides.

Iodide ion is capable of reducing both plutonium VI and plutonium IV to plutonium III in acid solution. The reactions are relatively fast, the half-time for the reduction of plutonium IV to plutonium III being of the order of a minute or less. In twenty minutes both plutonium IV and VI are completely reduced. This is proved by the fact that plutonium concentration corresponds to the normal solubility of plutonium trioxalate when precipitated after a twenty minute reduction and treatment with oxalic acid.

Hydrogen ion is consumed in the reduction of plutonium VI and may be consumed also in the reduction of plutonum IV if the plutonium IV is partially hydrolized. This is shown by the following reactions:

$$2PuO_2^{++} + 8H^+ + 9I^- = 2Pu^{+3} + 3I_3^- + 4H_2O$$
$$2PuO^{++} + 4H^+ + 3I^- = 2Pu^{+3} + I_3^- + 2H_2O$$

It was found that the plutonium nitrate obtained from the partial purification of the product of certain piles in which uranium was irradiated was very difficult to reduce with potassium iodide. This was caused by such material being about half plutonium VI nitrate and half plutonium IV nitrate. Substituting hydrogen iodide for potassium iodide to furnish both $H^+$ and $I^-$ corrected the trouble. Hydrogen iodide is preferably used for the reduction after an ether extraction of plutonyl nitrate prior to precipitating the reduced plutonium as the oxalate. This is not only to furnish $H^+$ for the reduction of plutonium VI but also to avoid the addition of metallic impurities.

It is necessary to add enough excess iodide ion to keep the iodine formed in solution as the tri-iodide ion.

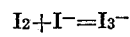

If the ratio of iodide ion over the tri-iodide ion falls below about 1.1 to 1, iodine will precipitate. Sufficient iodide is usually added to keep the iodide ion over the tri-iodide ion ratio three to one or greater. This allowed for some oxidation of the excess iodide ion by nitric acid.

When a mole of plutonium VI is reduced by iodide about 45 kilocalories of heat are liberated. To avoid excessive reaction of iodide ion and nitric acid, which react faster at higher temperature, the solution containing plutonium VI nitrate is preferably cooled to 15° C. before the addition of hydrogen iodide. This prevents the temperature from rising above 30° C. when the hydrogen iodide is added.

Although plutonium and the impurities are usually present in the higher valence or mixed valence states as stated supra, on the other hand both the plutonium and the impurities may be present in the reduced state. It may then be necessary to oxidize the impurities selectively or to oxidize both and then carry out the step as presented above. The process may be further modified to complex selectively the plutonium and oxidize the impurities. It is possible to use various combinations and variations of the above situations.

The second step in the preferred process is the precipitation of the plutonium in the reduced state by the formation of an insoluble compound. Several possibilities exist. If the concentration of plutonium is low it may be precipitated with a carrier such as bismuth phosphate or lanthanum fluoride. With higher concentration, direct precipitates such as the oxalate or fluoride may be formed. Experience has indicated that this can be readily accomplished by the formation of the plutonium fluoride since it is very insoluble. The following solubilities of plus three and plus four plutonium fluoride have been determined:

| Composition of Solution | Solubility (mg. Pu/liter) |
|---|---|
| Trivalent Plutonium: | |
| Fluoride | 1.0 M in HF and 0.5 M in HCl | 69 |
| Fluoride | 1.0 M in HF and 1.0 M in HCl | 49 |
| Fluoride | 1.0 M in HF and 2.0 M in HCl | 37 |
| Tetravalent Plutonium: | |
| Fluoride | 0.1-2.0 M in HNO$_3$ and 0.5-2.0 M in HF. | 350-700 |

A study of the solubilities shows the desirability of reducing the plutonium to the plus three state. This is also shown by the fact that the plutonium IV ion in low concentrations will not precipitate upon the addition of a soluble fluoride such as hydrogen fluoride unless potassium, sodium or similar positive ions are present. This however is not true of plutonium III which precipitates in the absence of these ions even at low concentrations.

However it may be seen that in view of its solubility plus four plutonium may be precipitated, particularly if it is the desired end product by properly adjusting conditions.

The third step in our process is to separate the bluish-purple plutonium trifluoride from the solution by decantation, centrifuging, filtering or any other satisfactory method for such separation. The precipitate is then carefully washed by a solution such as one which is 0.5 molar in nitric acid and 1 molar in hydrogen fluoride.

The plutonium trifluoride can then be thoroughly dried if desired. When this is done a black (or grey) form or a lavender form may result. Both solids have the same hexagonal crystal structure and are isomorphous with the trifluorides of uranium, lanthanum and cerium. The calculated density is 9.32 grams per milliliter. The melting point has been estimated at about 1170° C. The trifluoride may be converted to tetrafluoride by treatment with hydrogen fluoride containing about 5 mol percent of oxygen.

In the event plutonium tetrafluoride is prepared it will be a solid with the consistency of coarse face powder which varies in color from a light buff to a dull pink. The crystal is monoclinic and is isomorphous with the tetrafluorides of cerium, thorium, zirconium and uranium (green UF$_4$). The density, calculated from the lattice constants is 7.0 grams per milliliter. The tetrafluoride dissolves with great difficulty, usually requiring fusion with appropriate salts, long fuming with sulfuric or nitric acids, or treatment with aluminum salts. On heating in air it is slowly converted to dioxide, the oxidation being fairly rapid at 400° and still more rapid if water or ammonia is added to the air or oxygen. If the temperature is raised rapidly, particularly in the absence of water or ammonia, an oxyfluoride is formed which melts in the range of 900-950° C. The hard black solid (oxyfluoride) formed when the melt solidifies can be converted to an oxide, but this oxide will not react appreciably with hydrogen fluoride. The tetrafluoride is readily converted at elevated temperatures to trifluoride if hydrogen is present.

Of course the above procedure may be modified by starting with a mixture of plutonium and uranium in the mixed plus six oxyfluorides. In the event these are used as the original material the addition of the reducing iodide under proper conditions will immediately reduce the plutonium to the plus four and then substantially to the plus three oxidation state. The plutonium in the reduced state reacts with the fluoride ion present and precipitates substantially as the insoluble trifluorides with a small amount of tetrafluoride.

Although the separation is effectively made by precipitation from an aqueous solution, the insolubility of the plutonium in other liquids may be used. For example, the uranium as uranyl nitrate may be extracted with diethyl ether leaving behind the reduced plutonium.

As a preliminary purification process, it is feasible to adjust the valence of the plutonium compounds so that they are in a higher oxidation state, such as the plutonyl state, and then to treat the composition in the same manner as intended for the ultimate treatment of the reduced plutonium thereby first removing the impurities which might contaminate the plutonium. For example, it is possible to oxidize a plutonium compound such as plutonium nitrate in solution with various impurities to plutonyl nitrate, and then extract the plutonium in the plus six state with ethyl ether leaving impurities such as calcium nitrate in the aqueous solution. The plutonyl nitrate may then be reduced with iodide in aqueous solution, followed by extraction of uranyl nitrate from the aqueous solution of trivalent plutonium by diethyl ether.

The method is simple and is efficient because of the very low solubility of the plus three plutonium fluoride.

*Example*

A liter of concentrated past solution containing 160 grams of plutonium as mixed plus four and plus six plutonium nitrate in 1.5 molar nitric acid is carefully analyzed and placed in a storage container. This paste, which has been obtained by partial decontamination and purification of plutonium produced by the neutron irradiation of uranium, contains partially purified plutonium present with impurities which have not been removed by the prior steps. The impurities comprise uranium and many of the various radioactive fission products.

As soon as it is desired to process the batch the nitrate paste is transferred from the storage container to the jacketed work tanks by dissolving the paste and washing the containers by the addition of approximately 1.1 liters of one molar aqueous nitric acid solution to obtain the mixture of plus four and plus six plutonium nitrates as approximately 0.3 molar plutonium solution.

This solution is cooled to approximately 15° C. and about 1.2 liters of 5.5 molar hydrogen iodide are then added and thoroughly agitated. The solution is then permitted to stand for at least twenty minutes in order to insure complete reduction of the plutonium to the plus three valence state. The resulting 3.3 liters of solution then have the following approximate composition.

0.2 molar plus three plutonium ion
2 molar hydrogen ion
1.2 molar nitrate ion
1 molar iodide ion
0.3 molar tri-iodide ion .70 liter of 3 M hydrofluoric acid are then added. The slurry is then thoroughly stirred and is then allowed to stand for about 30 minutes.

The supernatant is then siphoned off and recycled. 5 liters of a solution of 0.5 molar in nitric acid and one molar in hydrogen fluoride is then introduced to wash the precipitate. The stirrer is operated for five minutes and then the slurry is allowed to stand for 30 minutes. The supernatant wash solution is siphoned off, and the washing operation is repeated exactly as before again using 5 liters of a solution 0.5 molar in nitric acid and one molar in hydrogen fluoride as the wash solution. The washed plutonium trifluoride is finely separated from the solution by filtration and is found to be a bluish-purple color.

The foregoing examples and procedures are given for the purpose of illustrating the present invention but are not intended to be limited on the scope thereof. As many widely different embodiments of the invention can be made without departing from the spirit and scope thereof, it is to be understood that this application is not to be limited except as indicated in the appended claim.

What is claimed is:

The process which comprises reducing, under acidic conditions in an aqueous solution, plutonium ions selected from the class consisting of hexavalent and tetravalent plutonium ions with a soluble iodide, forming an insoluble precipitate of said trivalent plutonium by the addition of oxalic acid, and removing said aqueous solution from said precipitate.

References Cited in the file of this patent

Seaborg: Chemical and Eng. News, vol. 23, No. 23, pp. 2190–2193, December 10, 1945.

Harvey et al.: Journal of the Chemical Society, August 1947, pp. 1010–1021.